(12) United States Patent
Mccann et al.

(10) Patent No.: US 11,587,044 B2
(45) Date of Patent: *Feb. 21, 2023

(54) SYNCHRONIZED CONVERSATION-CENTRIC MESSAGE LIST AND MESSAGE READING PANE

(71) Applicant: Microsoft Technology Licensing, LLC, Redmond, WA (US)

(72) Inventors: Robert Emmett Mccann, Seattle, WA (US); Michael Anthony Affronti, Seattle, WA (US); Andrew Russell Brauninger, Seattle, WA (US); Jorge Pereira, Seattle, WA (US); James J. Edelen, IV, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/215,172

(22) Filed: Mar. 29, 2021

(65) Prior Publication Data

US 2021/0241232 A1  Aug. 5, 2021

Related U.S. Application Data

(63) Continuation of application No. 15/605,004, filed on May 25, 2017, now Pat. No. 10,997,562, which is a (Continued)

(51) Int. Cl.
*G06Q 10/10* (2012.01)
*G06Q 10/107* (2023.01)

(52) U.S. Cl.
CPC .................. *G06Q 10/107* (2013.01)

(58) Field of Classification Search
CPC .................................... G06Q 10/107
See application file for complete search history.

(56) References Cited

U.S. PATENT DOCUMENTS

| 6,466,240 B1* | 10/2002 | Maslov ............. G06F 8/34 715/234 |
| 2004/0103364 A1* | 5/2004 | Dornback ........... G06F 9/451 715/201 |

(Continued)

OTHER PUBLICATIONS

Venolia et al, Supporting Email Workflow (2001).*
(Continued)

*Primary Examiner* — Di Xiao

(57) ABSTRACT

Technologies are described herein for a user interface uniting two primary components, a list view and a reading pane, within a message reading application. Technologies are also described for synchronizing status and parameters between the two primary user interface components. In particular, a user interface for reading messages can represent all components of a conversation with both a list view for presenting a message map, and a reading pane for presenting a content view. The list view can present a list of messages grouped by conversation. The reading pane window can contain smaller windows or frames. Each of the smaller windows or frames can contain a message within a given conversation. Synchronization provided between the list view and a reading pane can allow message selection in one of the user interface components to cause display and selection of the corresponding message in the other user interface component.

17 Claims, 5 Drawing Sheets

Related U.S. Application Data continuation of application No. 12/142,927, filed on Jun. 20, 2008, now Pat. No. 9,665,850.

(56)  References Cited

U.S. PATENT DOCUMENTS

| | | | | |
|---|---|---|---|---|
| 2005/0223066 | A1* | 10/2005 | Buchheit | G06Q 10/107 709/217 |
| 2006/0053380 | A1 | 3/2006 | Spataro et al. | |
| 2006/0168025 | A1* | 7/2006 | Jain | H04L 51/066 709/206 |
| 2008/0037721 | A1* | 2/2008 | Yao | G06Q 10/107 379/88.11 |
| 2008/0141242 | A1* | 6/2008 | Shapiro | G06F 8/61 717/174 |

OTHER PUBLICATIONS

John Wiley & Sons, Microsoft Office Outlook 2007 For Dummies (2006).*
"Search Report Issued in European Patent Application No. 21159568.1", dated Jun. 2, 2021, 9 Pages.
"Office Action Issued in Thailand Patent Application No. 1101003034", dated Oct. 6, 2021, 3 Pages.

* cited by examiner

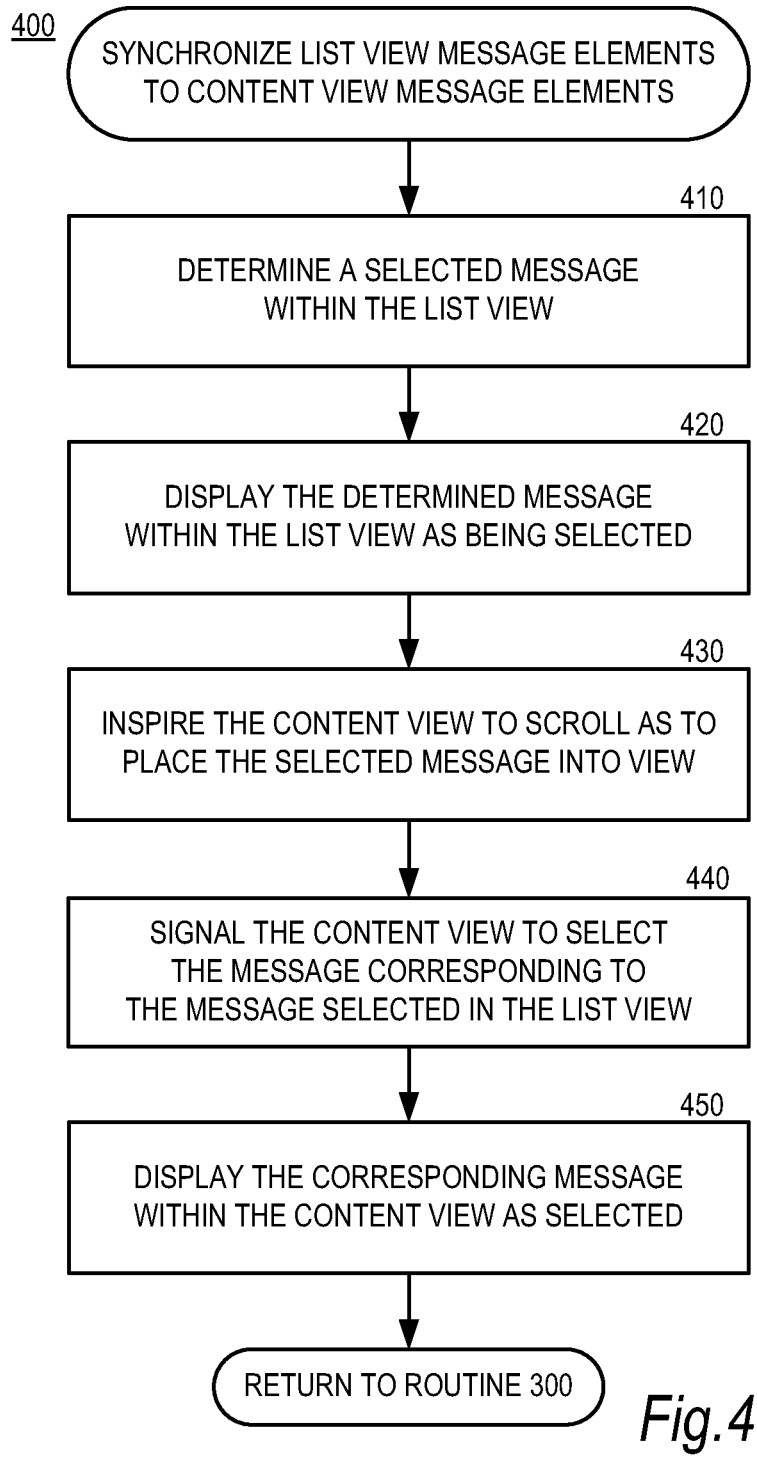

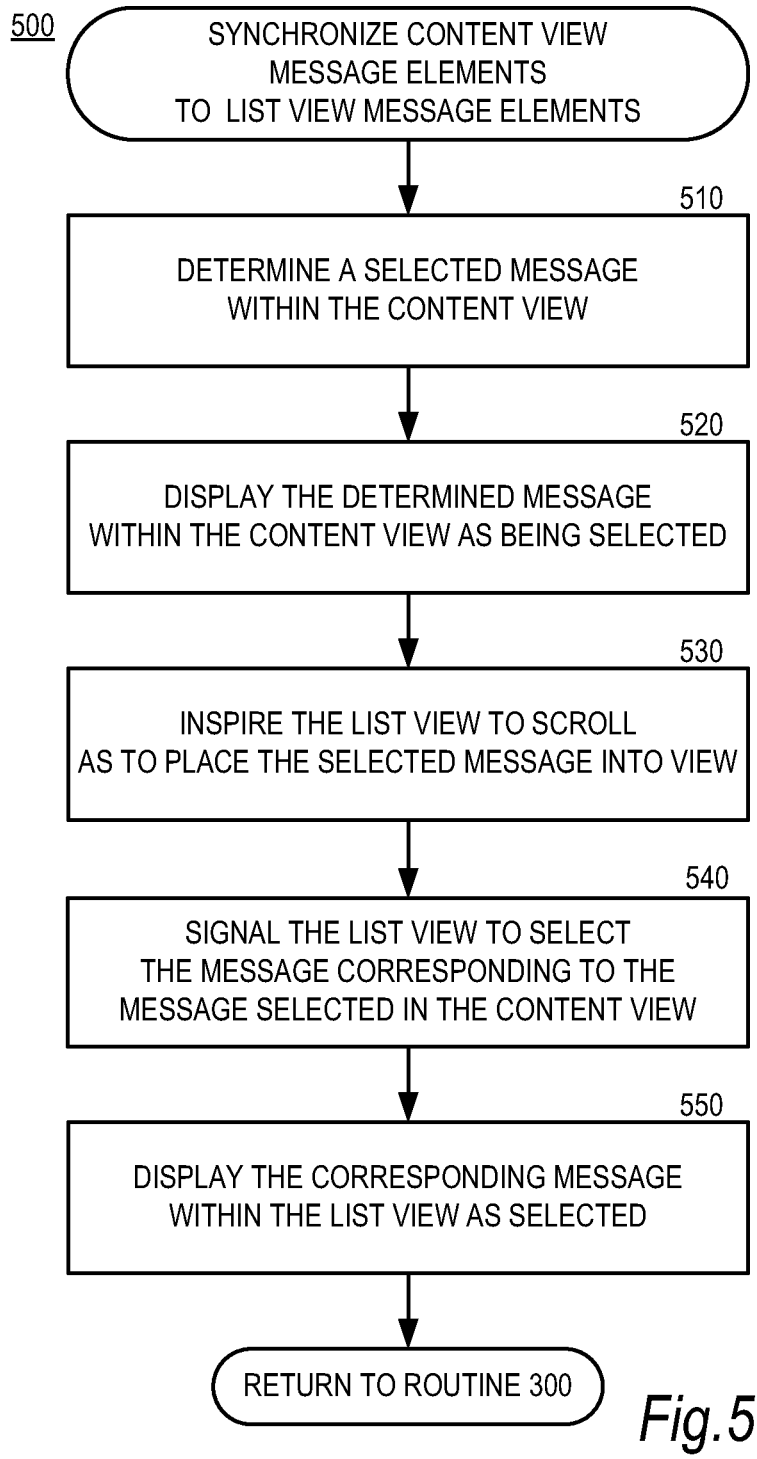

SYNCHRONIZED CONVERSATION-CENTRIC MESSAGE LIST AND MESSAGE READING PANE

CROSS-REFERENCE TO RELATED APPLICATIONS

This application is a continuation application of U.S. patent application Ser. No. 15/605,004, filed on May 25, 2017, which application is a continuation application of U.S. patent application Ser. No. 12/142,927 (now U.S. Pat. No. 9,665,850), filed on Jun. 20, 2008, the entire disclosures of which are hereby incorporated herein by reference.

BACKGROUND

Some modern applications for reading electronic mail (e-mail) messages are able to group messages into logical conversations. Such conversations are established by grouping together all messages that are replies to one another or to a common root message. The displaying of messages in conversation groupings is supported by various e-mail reading applications such as the OUTLOOK e-mail client from MICROSOFT CORPORATION; the OUTLOOK WEB ACCESS (OWA) e-mail application from MICROSOFT CORPORATION; the ZIMBRA e-mail client from ZIMBRA, INCORPORATED; and the GMAIL e-mail client from GOOGLE, INCORPORATED.

In previous implementations, there generally are two distinct models for conversation based e-mail reading. Some e-mail reading applications provide a list of messages grouped by conversations. A user can select an item from the list to see the contents, or body, of that single selected message in another window or pane of the user interface. Other e-mail reading applications provide a list of conversations, as groups of messages, from which users can choose to view the message contents of all of the messages within a given conversation at once.

The first of the traditional two models for e-mail reading applications generally provides a view of the all conversation messages in a concise list. The second of the traditional two models for e-mail reading applications generally provides all of a conversation's message contents in a single view. However, the display and synchronization of both a message list and a message content view with respect to message conversations is not traditionally supported.

It is with respect to these considerations and others that the disclosure made herein is presented.

SUMMARY

Technologies are described herein for a user interface uniting two primary components, a list view and a reading pane, both within an e-mail reading application. Technologies related to the synchronization functionality between the two primary user interface components are also described. In particular, a user interface for reading email can represent a conversation with both a list view for presenting a message map and a reading pane for presenting a content view, all within a single user interface display.

According to one aspect presented herein, a first primary user interface component for an e-mail reading application can be a list view. The list view can present a list of messages grouped by conversation. Each grouping can have a header section that shows aggregate information about the messages in the conversation. The conversation can be selected and expanded in the list to show all of the component messages of the conversation. The items can be selected using a mouse, keyboard, or other user input mechanisms. The list view can provide the user a map of a conversation. The map can indicate a reply structure of the messages, a time ordering in which the messages were received, or both.

According to another aspect presented herein, a second primary user interface component for an e-mail reading application can be a reading pane. The reading pane window can contain smaller windows or frames. Each of the smaller windows or frames can contain a message within a given conversation. These frames may be called message parts and can be expanded or collapsed to show more or less of the messages contents or details. The frames within the reading pane can be selected and acted upon in a similar fashion as those in the list view.

According to yet another aspect presented herein, synchronization can be provided between the list view and a reading pane. By synchronizing actions in the list view and the reading pane, the contents can be cross referenced and navigated. For example, a message can be selected with an appropriate user input device, such as through a mouse click, in the list view resulting in that message also being selected and displayed in the reading pane. Similarly, a message can be selected in the reading pane causing that message to become highlighted in the list view indicating its position in the reply structure of the conversation. Message selection in one message UI component can also inspire the other primary message UI component to scroll the corresponding item into view. Thus, the two components can maintain a view on the same selected message items.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a logical flow diagram illustrating aspects of a process for synchronizing list view message elements to content view message elements according to aspects of an embodiment presented herein; and FIG. 5 is a logical flow diagram illustrating aspects of a process for synchronizing content view message elements to list view message elements according to aspects of an embodiment presented herein.

DETAILED DESCRIPTION

Figure 1:
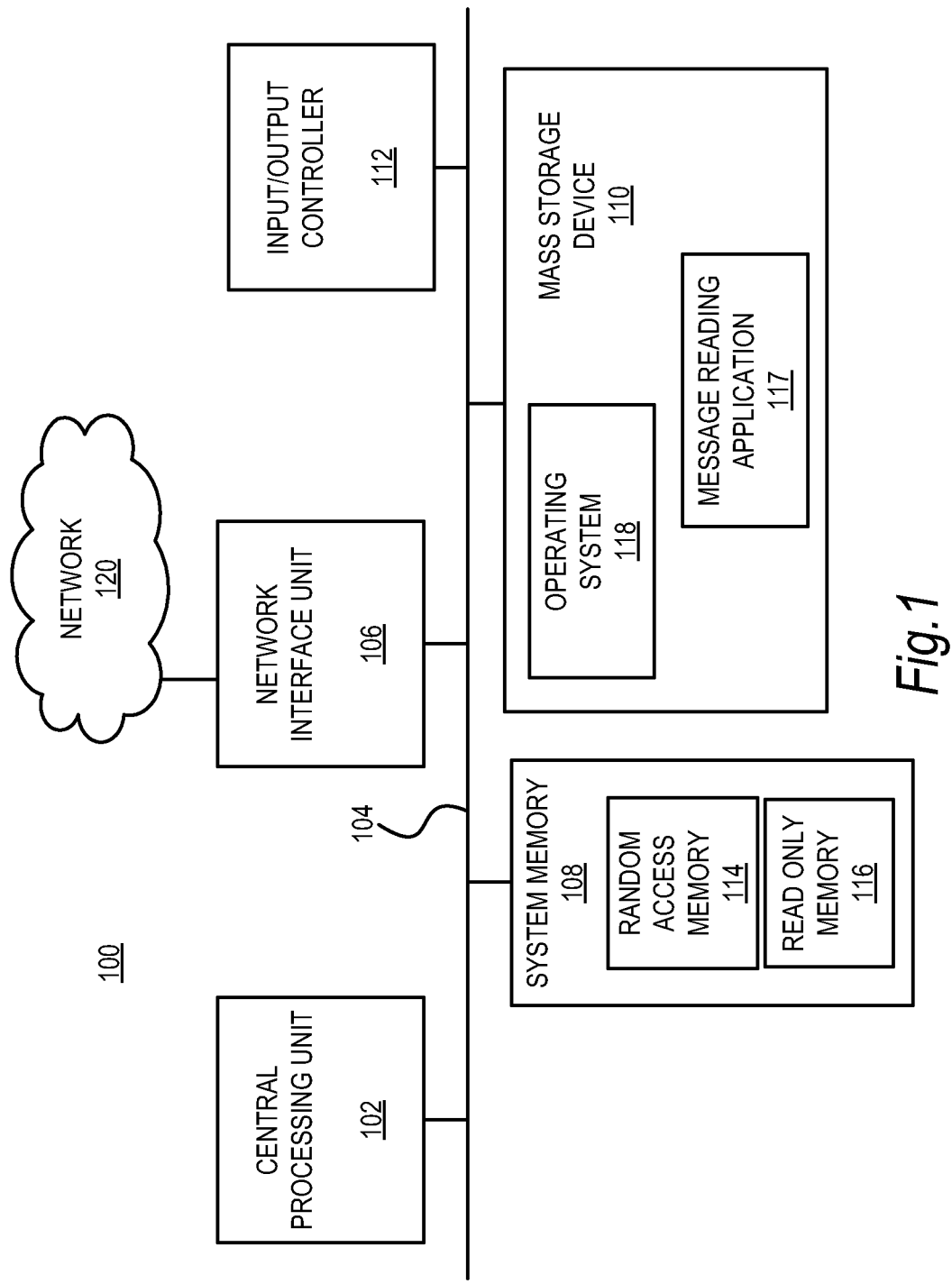
FIG. 1 is a computer architecture diagram showing an illustrative computer hardware and software architecture for a computing system capable of implementing aspects of an embodiment presented herein.

The following detailed description is directed to technologies for displaying and synchronizing a unified list view and reading pane within the user interface of a message reading application. Through the use of the technologies and concepts presented herein, both a list view for presenting a message map and a reading pane for presenting a content view can be unified within a single user interface display. Synchronization between the two views can also be provided.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for displaying and synchronizing a unified list view and a reading pane for organizing, previewing, navigating, and reading electronic messages will be described.

Turning now to FIG. 1, an illustrative computer architecture 100 can execute software components described herein for displaying and synchronizing a unified list view and a reading pane within the user interface of a message reading application. The computer architecture shown in FIG. 1 illustrates a conventional desktop, laptop, or server computer and may be utilized to execute any aspects of the software components presented herein. It should be appreciated however, the described software components can also be executed on other example computing environments, such as mobile devices, television, set-top boxes, kiosks, vehicular information systems, mobile telephones, embedded systems, or otherwise.

The computer architecture shown in FIG. 1 includes a central processing unit 102 (CPU), a system memory 108, including a random access memory 114 (RAM) and a read-only memory 116 (ROM), and a system bus 104 that can couple the system memory 108 to the CPU 102. A basic input/output system containing the basic routines that help to transfer information between elements within the computer 100, such as during startup, can be stored in the ROM 116. The computer 100 may further include a mass storage device 110 for storing an operating system 118, application programs, and other program modules, such as a message reading application 117 which can execute the software components described in greater detail herein.

The mass storage device 110 can be connected to the CPU 102 through a mass storage controller (not shown) connected to the bus 104. The mass storage device 110 and its associated computer-readable media can provide non-volatile storage for the computer 100. Although the description of computer-readable media contained herein refers to a mass storage device, such as a hard disk or CD-ROM drive, it should be appreciated by those skilled in the art that computer-readable media can be any available computer storage media that can be accessed by the computer 100.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 100.

According to various embodiments, the computer 100 may operate in a networked environment using logical connections to remote computers through a network such as the network 120. The computer 100 may connect to the network 120 through a network interface unit 106 connected to the bus 104. It should be appreciated that the network interface unit 106 may also be utilized to connect to other types of networks and remote computer systems. The computer 100 may also include an input/output controller 112 for receiving and processing input from a number of other devices, including a keyboard, mouse, or electronic stylus (not illustrated). Similarly, an input/output controller may provide output to a display screen, a printer, or other type of output device (also not illustrated).

As mentioned briefly above, a number of program modules and data files may be stored in the mass storage device 110 and RAM 114 of the computer 100, including an operating system 118 suitable for controlling the operation of a networked desktop, laptop, server computer, or other computing environment. The mass storage device 110, ROM 116, and RAM 114 may also store one or more program modules. In particular, the mass storage device 110, the ROM 116, and the RAM 114 may store a message reading application 117 for execution by the CPU 102. The e-mail message reading application 117 can include software components for implementing the processes discussed in detail with respect to FIGS. 3-5. The mass storage device 110, the ROM 116, and the RAM 114 may also store other types of program modules.

Figure 2:
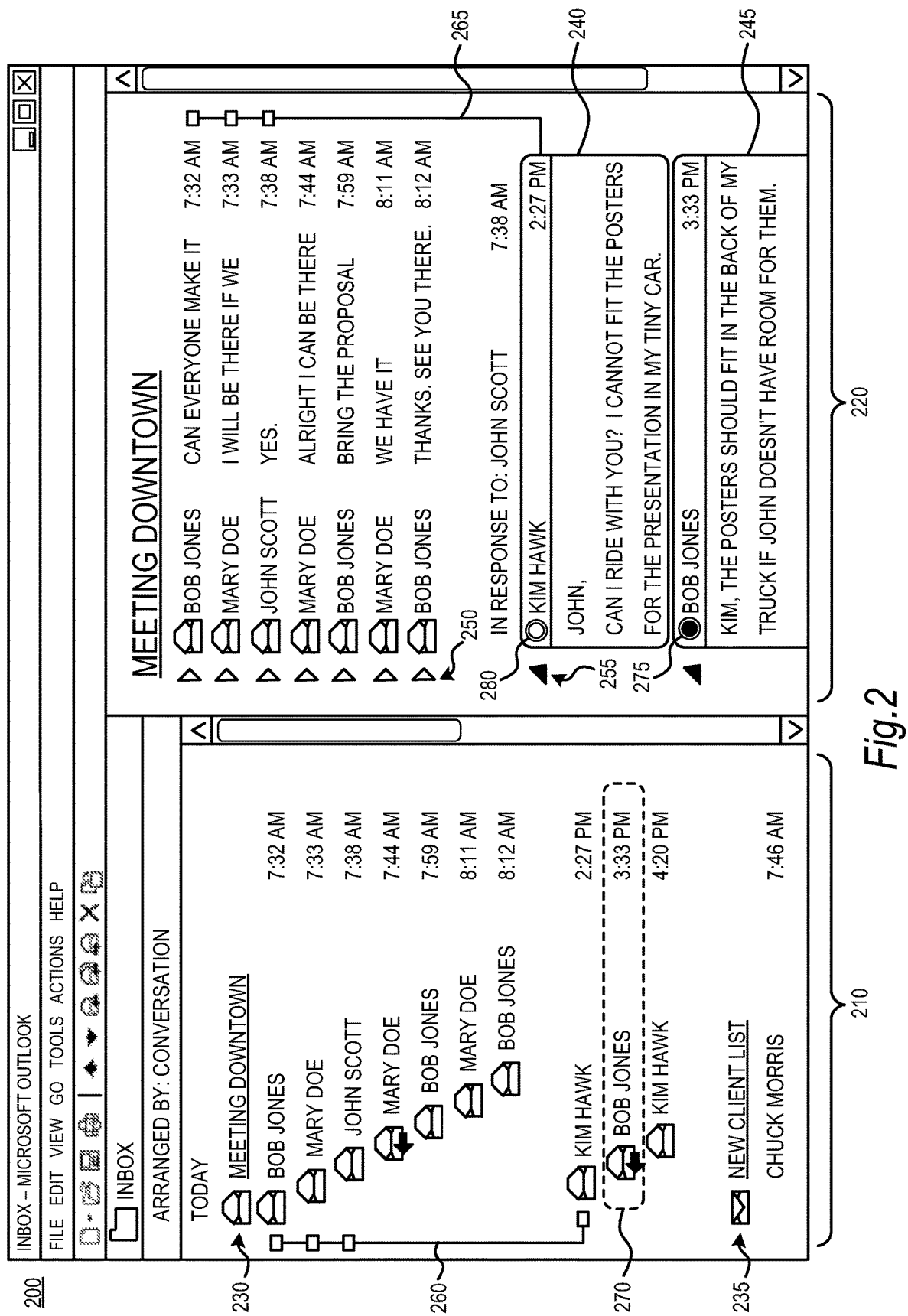
FIG. 2 is a user interface diagram illustrating a list view and a reading pane content view integrated into one display for reading electronic messages according to aspects of an embodiment presented herein.

Turning now to FIG. 2, details will be provided regarding displaying and synchronizing a list view and a reading pane within a unified user interface of an e-mail message reading application. In particular, a user interface display 200 illustrates a list view 210 and a reading pane 220 content view integrated into one display for message reading.

An inbox folder is illustrated where e-mail messages (messages) are listed by conversation in a list view 210. The list view 210 of messages can serve as a visual map of the messages based upon the reply structure of the messages within each conversation. That is, a message can be displayed as below and indented from a message to which it was a reply. Since a reply was generally sent after the original message, such a structure also supports displaying the messages in time order. When specified by a user, the list view 210 can also be displayed in reverse time ordering within each conversation. Messages within a conversation, as shown in the list view 210, may be stored in multiple folders. For example, some messages of a conversation may be from a sent messages folder or a favorites folder. Even though a conversation may be shown in association with a specific folder, some messages of the conversation may be from other folders.

Within the list view 210, an expanded conversation 230 can be displayed with all of the messages within the conversation broken out explicitly in a time ordering or reply structure. A collapsed conversation 235 may show less information about the conversation to provide rapid access to concise information. For example, the collapsed conversation 235 may show the subject line of the conversation, the authors of messages within the conversation, and timestamps associated with messages within the conversation.

A broken out message within a conversation in a list view 210 can occur where a reply, or forwarded, message branches off to form a sub-thread within a conversation topic. A list view pipe 260 within the list view 210 can show the connection between a broken out message and the parent message that it was based upon, for example as a reply to. The list view pipe 260 can also have multiple indicators, such as the blocks along the list view pipe 260 as illustrated in FIG. 2. Such indicators can display the relationship of the entire chain of messages preceding the broken out message. For example, which messages in a larger conversation are part of a specific thread or reply chain.

Details and contents of messages can be displayed in a content view within a reading pane 220. The reading pane 220 can contain smaller windows or frames 240, 245. Each of the frames 240, 245 can contain a message within a given conversation. The frames 240, 245 can be expanded or collapsed to show more or less of the message contents or details. The collapsed frames can be displayed as a list of message, such as those in the top portion of the reading pane 220 illustrated in FIG. 2. A collapsed frame expander 250 user interface control may be provided for each collapsed frame where operating the collapsed frame expander 250 can expand the frame 240, 245. Once the associated frame is expanded, the frame expander can be displayed as an expanded frame expander 255 user interface control. An expanded frame expander 255 can be used to collapse the expanded frame 240, 245 back into the list of message within the reading pane 220.

A content view pipe 265 can be used to associate an expanded frame 240 with the parent message that it was based upon, for example, by being a reply to the parent message. The content view pipe 265 can also have multiple indicators, such as the blocks along the content view pipe 265 as illustrated in FIG. 2. Such indicators can display the relationship of the entire chain of messages preceding the message within the expanded frame 240.

Actions on the list view 210 or the reading pane 220 can be synchronized between one another. This can allow a user to cross reference or navigate the contents of the two views. For example, the user can click on a message in the list view 210 to indicate the message as a selected message 270 within list view 210. Synchronization can then cause the corresponding message within the reading pane 220 to be displayed as a selected message 245 within the reading pane 220. The selected message 245 can also thus be opened for reading within the reading pane 220. Similarly, a user can select a message from within the reading pane 220 and that message can be automatically shown as the selected message 270 within the list view 210. This can quickly indicate the position within the reply structure of the message being viewed in the reading pane 220. In other words, the synchronization between the list view 210 and the reading pane 220 can be bidirectional.

Item selection can also inspire the list view 210 and the reading pane 220 to scroll and place the appropriate item into view based on a selection within the other user interface component. For example, the selection of a message within the list view 210 can scroll the reading pane 220 such that the selected item is also viewable within the reading pane 220.

The selected message 245 within the reading pane 220 can be indicated as selected by various user interface techniques. One example for displaying a frame as selected within the reading pane 220 can use a highlighted select button 275 within the selected message frame 245. In contrast, a non-highlighted select button 280 can indicate that an expanded message frame 240 is not selected. Other techniques of displaying a message frame as selected can include coloring, highlighting, shading, shadowing, checkbox indication, bolding, blinking, modifying opacity, offsetting, or any other mechanism for indicating a message as being selected.

Synchronization can effectively combine the list view 210 and the reading pane 220 into a unified user interface. Synchronizing the actions between the two controls can provide the list view 210 as a map and navigation tool while also providing the reading pane 220 as a content viewer. The content viewer can display more or less details of each message within a conversation as specified by the user. While synchronization of selection is used as an example of synchronization, message status, deletion, movement, addition, or any other message action, or parameter, can also be synchronized between the list view 210 and the reading pane 220.

Figure 3:
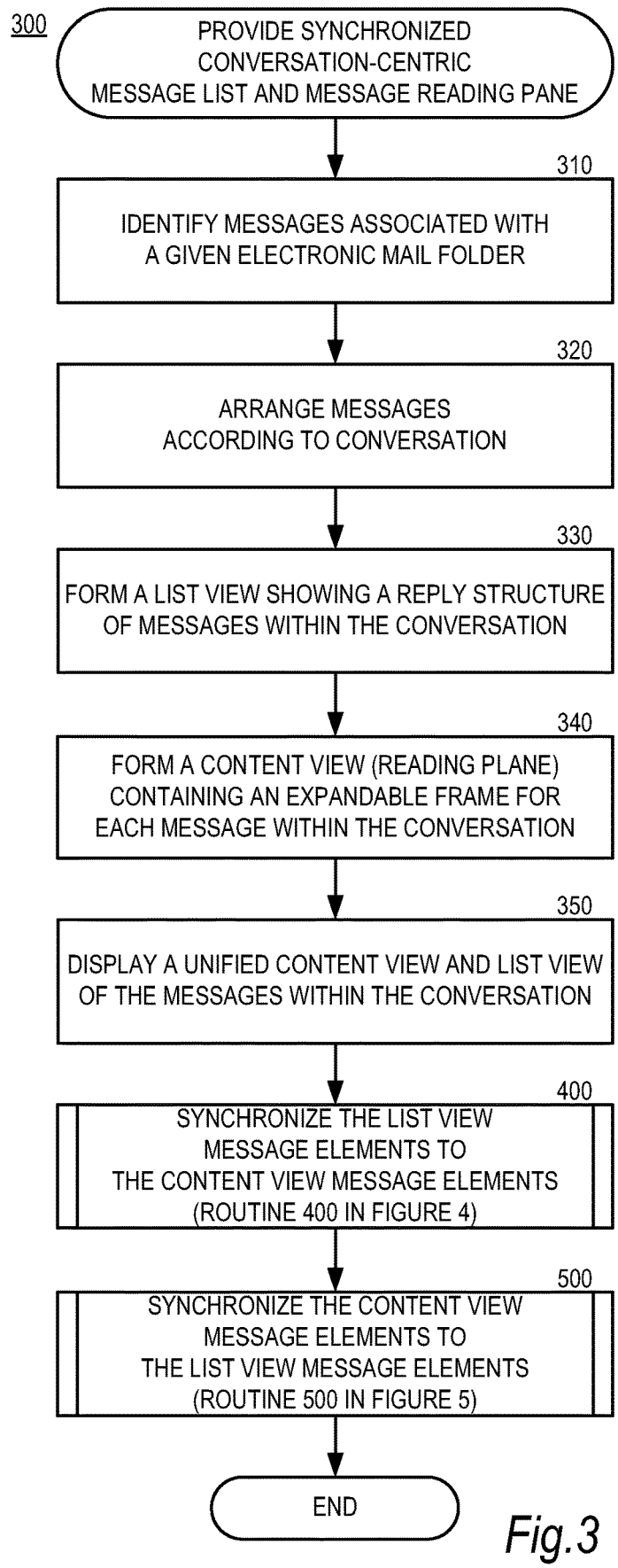
FIG. 3 is a logical flow diagram illustrating aspects of a process for presenting and synchronizing a conversation-centric message list and a message reading pane according to aspects of an embodiment presented herein.

Referring now to FIG. 3, additional details will be provided regarding the embodiments presented herein for displaying and synchronizing a unified list view and reading pane within the user interface of a message reading application. In particular, FIG. 3 is a flow diagram illustrating aspects of a process 300 for providing a synchronized conversation-centric message list and message reading pane.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed sequentially, in parallel, or in a different order than those described herein.

The routine 300 begins at operation 310, where messages within a given collection or group are identified. The collection of messages or group of messages may be those associated with a specific user. At operation 320, the identified messages can be arranged according to conversations. A conversation can include all messages that are replies to one another or to a common root message.

At operation 330, a list view 210 can be formed showing the reply structure of all messages within each conversation.

The conversations, and the messages within each conversation, can be those determined in operation 320. At operation 340, a reading pane 220 can be formed to provide a content view. The reading pane 340 can contain a message frame 240, 245 for each message by conversation. Each message frame 240, 245 can be expanded to display detailed message content. Alternatively, each message frame 240, 245 can be collapsed to provide a concise message list within the reading pane 220.

At operation 350, a unified user interface can be displayed. The unified display can unite two primary user interface components, a list view 210 as formed in operation 330 and a reading pane 220 as formed in operation 340.

Routines 400 and 500 relate to synchronization between the list view 210 and the reading pane 220. In routine 400, list view 210 message elements can be synchronized to the message elements in the reading pane 220 as discussed in additional detail with respect to FIG. 4. In routine 500, message elements in the reading pane 220 can be synchronized to the list view 210 message elements as discussed in additional detail with respect to FIG. 5. Such synchronization can relate to indications of a message item, or items, being selected. Synchronization can also relate to the display, deletion, addition, modification, or reclassification of one or more message elements. Synchronizing between user interface views can provide simplified, powerful message navigation since the view that is most meaningful for a given navigation task can be used with the results propagating to the other synchronized view. For example, a message may be selected out of the map provided by a list view 210 resulting in the display of that message within a reading pane 220 of the unified display. The routine 300 can terminate after returning from routine 500.

Referring now to FIG. 4, additional details will be provided regarding the embodiments presented herein for displaying and synchronizing a unified list view and reading pane within the user interface of a message reading application. In particular, FIG. 4 is a flow diagram illustrating aspects of a process 400 for synchronizing list view message elements to content view message elements. The routine 400 begins at operation 410, where a selected message 270 within a list view 210 is determined. The selected message 270 may have been selected by a user. For example, a user may have clicked on the message with a mouse pointer, or some other input device.

At operation 420, the selected message 270 that was determined in operation 410 can be displayed as selected within the list view 210 of the user interface display. Selection may be displayed by highlighting, blinking, shading, coloring, bolding, or inversing the selected message 270 within the list view 210 display. Any other mechanism for indicating selection may also be used according to embodiments.

At operation 430, the content view provided by the reading pane 220 can be signaled, or inspired, to scroll. The scrolling can operate so as to make visible the message within the reading pane 220 that corresponds to the selected message 270 within the list view 210. At operation 440, the content view provided by the reading pane 220 user interface component can be signaled to select the message within the reading pane 220 that corresponds to the selected message 270 within the list view 210. Accordingly, in operation 450, the selected message 245 within the reading pane 220 content view can be displayed as the currently selected message. Selection may be indicated by highlighting, or coloring the message select button 275 within the message frame of the reading pane 220 content view. Selection may be also be displayed by highlighting, blinking, shading, coloring, bolding, or inversing part, or all of, the selected message 245 within the reading pane 220 display. Any other mechanism for indicating selection may also be used according to embodiments.

Such synchronization can provide for the same message, or messages, being both visible and selected at the same time in both the list view 210 and the reading pane 220. While selection has been discussed as an example of message synchronization between the list view 210, and the reading pane 220, other message parameters may also be the subject of the synchronization. For example, deletion, modification, addition, movement, or other message actions, status, or properties may be synchronized between the list view 210 and the reading pane 220 according to the methods discussed herein. The routine 400 can return to routine 300 after operation 450.

Referring now to FIG. 5, additional details will be provided regarding the embodiments presented herein for displaying and synchronizing a unified list view and reading pane within the user interface of a message reading application. In particular, FIG. 5 is a flow diagram illustrating aspects of a process 500 for synchronizing content view message elements to list view message elements. The routine 500 begins at operation 510, where a selected message 245 within a reading pane 220 content view is determined. The selected message 245 may have been selected by a user. For example, a user may have clicked on the message with a mouse pointer, or some other input device.

At operation 520, the selected message 245 that was determined in operation 510 can be displayed as selected within the reading pane 220 of the user interface display. Selection may be displayed by highlighting, blinking, shading, coloring, bolding, inversing, or using a highlighted selected button 275 within the frame of the selected message 245. Any other mechanism for indicating selection may also be used according to embodiments.

At operation 530, the list view 210 can be signaled, or inspired, to scroll. The scrolling can operate so as to make visible the message within the list view 210 that corresponds to the selected message 245 within the reading pane 220. At operation 540, the list view 210 user interface component can be signaled to select the message within the list view 210 that corresponds to the selected message 245 within the reading pane 220. Accordingly, in operation 550, the selected message 270 within the list view 210 can be displayed as the currently selected message. Such synchronization can provide for the same message, or messages, being both visible and selected at the same time in both the list view 210 and the reading pane 220. The routine 500 can return to routine 300 after operation 550.

Based on the foregoing, it should be appreciated that technologies for displaying and synchronizing a unified list view and a reading pane within the user interface of a message reading application are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A system comprising:
a processor; and
memory coupled to the processor, the memory comprising computer executable instructions that, when executed by the processor, performs a method comprising:
providing a list view of a plurality of messages organized chronologically by conversation;
providing a content view of the plurality of messages organized chronologically by conversation, wherein the list view and the content view are integrated in a display;
selecting a first message within the list view; and
in response to selecting the first message within the list view, selecting a second message in the content view, wherein updating a message status of the first message causes updating of a message status of the second message, and the first message is stored in an inbox and the second message is stored in a sent messages folder or a favorites folder.

2. The system of claim 1, wherein the display is a user interface of an email message reading application.

3. The system of claim 1, wherein the list view and the content view are bi-directionally synchronized.

4. The system of claim 1, wherein the list view is a visual map of the plurality of messages based upon a reply stricture within one or more conversations.

5. The system of claim 1, wherein an expanded view of the plurality of messages displays each of the plurality of messages broken out chronologically.

6. The system of claim 1, wherein a collapsed view of the plurality of messages displays a subject line of a conversation and does not display the plurality of messages.

7. The system of claim 1, wherein the content view includes one or more frames respectively comprising a message within a conversation.

8. The system of claim 1, wherein selecting the first message within the list view causes the content view to scroll to the second message such that content of the second message is viewable in the content view.

9. The system of claim 1, wherein selecting the second message within the content view comprises opening the second message for reading and highlighting the second message.

10. A method comprising:
providing a list view of a plurality of messages organized chronologically by conversation;
providing a content view of the plurality of messages organized chronologically by conversation, wherein the list view and the content view are integrated in a user interface;
selecting a first message within the content view; and
in response to selecting the first message within the content view, bi-directionally synchronizing between the content view and the list view such that updating a message status of the first message causes updating of a message status of a second message within the list view, wherein the second message corresponds to the first message, and
wherein the first message is stored in an inbox of an email message reading application and the second message is stored in a folder that is different from the inbox.

11. The method of claim 10, wherein the plurality of messages in the list view are provided such that a reply message is displayed below and indented from a message to which the reply message is a reply.

12. The method of claim 10, wherein the list view comprises a list view pipe that shows a connection between a broken out message and a parent message of the broken out message, the broken out message representing a sub-thread of a conversation.

13. The method of claim 12, wherein the list view pipe comprises one or more indicators that display a relationship of two or more of the plurality of messages.

14. The method of claim 10, wherein the plurality of messages in the content view comprise at least one of details or content and the plurality of messages in the list view do not comprise the details or content.

15. The method of claim 10, wherein updating the message status of the first message comprises at least one of:
removing the first message from the content view; or
moving the first message within the content view.

16. The method of claim 10, wherein selecting the first message within the content view causes the second message to be highlighted in the list view.

17. A method comprising:
providing a list view of a plurality of messages organized chronologically by conversation;
providing a content view of the plurality of messages organized chronologically by conversation, wherein the list view and the content view are integrated in one display;
selecting a first message within the list view; and
in response to selecting the first message within the list view, bi-directionally synchronizing between the list view and content view, wherein the bi-directionally synchronizing comprises:
opening a second message in the content view for viewing, wherein removing the first message from the list view causes the second message to be removed from the content view, and
wherein the first message is stored in an inbox of an email message reading application and the second message is stored in a folder that is different from the inbox.

* * * * *